United States Patent [19]
Ochs

[11] 3,741,558
[45] June 26, 1973

[54] DEVICE FOR SECURING AND TENSIONING COILED SPRINGS

[76] Inventor: John Ochs, 2923 Yerrling Street, Lakewood, Calif. 90712

[22] Filed: Oct. 26, 1971

[21] Appl. No.: 192,444

[52] U.S. Cl. .............................................. 267/73
[51] Int. Cl. ............................................. F16f 1/26
[58] Field of Search ................. 267/73, 74; 248/59, 248/55; 49/199, 206

[56] References Cited
UNITED STATES PATENTS
3,588,074 6/1971 Ochs .................................... 267/73
3,302,911 2/1963 Bender ................................ 248/59

Primary Examiner—James B. Marbert
Attorney—Whann & McManigal

[57] ABSTRACT

A device for securing and tensioning garage door springs in place including a cross-bar member, a downwardly extending rod threadably connected at one end to the cross-bar member and having a hook at the other end adapted to engage an anchor bracket, a pair of spaced upwardly extending threaded rods which protrude through apertures in the cross-bar and have hooked upper ends adapted to be connected to the springs, and nuts on each of the lower ends of said threaded rods adapted to engage the lower face of the cross-bar so that the threaded rods may be axially adjusted relative to the cross-bar.

4 Claims, 7 Drawing Figures

PATENTED JUN 26 1973
3,741,558
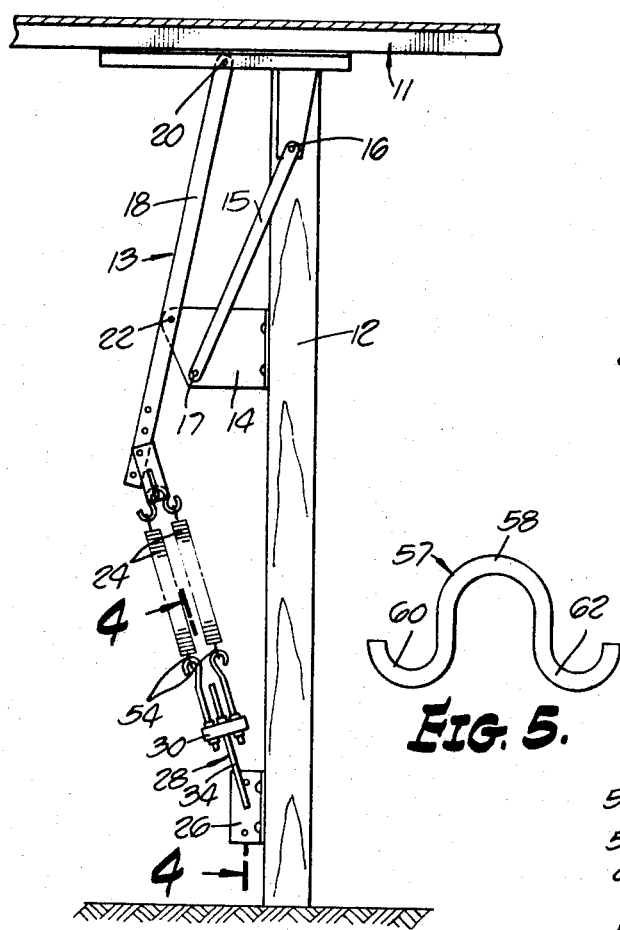
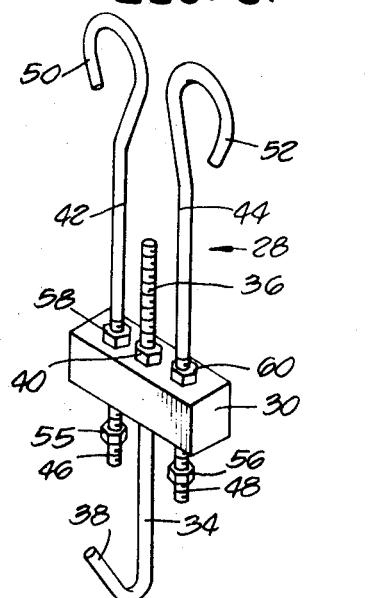
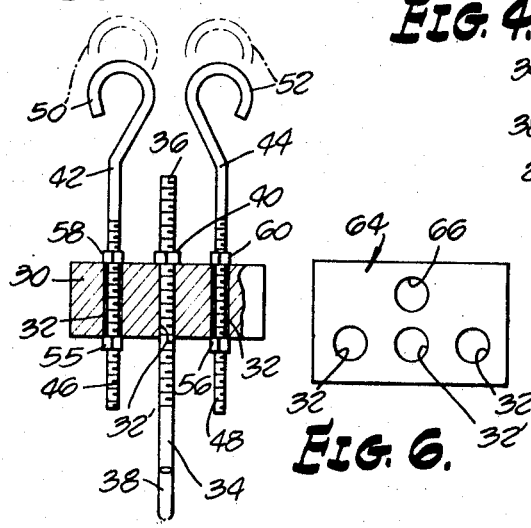
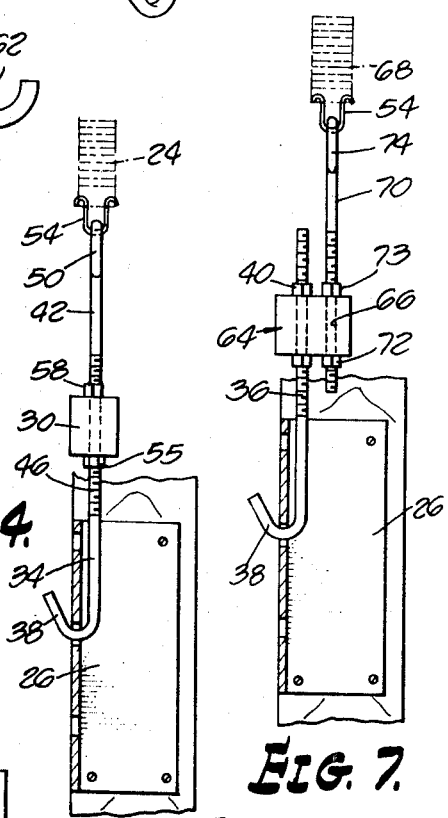
JOHN OCHS
INVENTOR.
WHANN & McMANIGAL
Attorneys for Applicant
BY
Robert M. McManigal

DEVICE FOR SECURING AND TENSIONING COILED SPRINGS

BACKGROUND OF THE INVENTION

This invention relates generally to special fittings, brackets, hooks and the like used for the purpose of securing an end of one or more tension springs to an anchor point and particularly to such devices as are used for securing the tension springs incorporated in the hardware suspension systems of the overhead or upwardly swinging type of garage doors.

The common upwardly opening or swinging type of garage door usually employs at least one and customarily two extremely stiff, helically coiled tension springs at each side which must be installed under considerable tension in order to be effective. The strength and stiffness of these springs are so great that, without special equipment, it is very difficult for most people to install or replace or even adjust the tension of the springs.

One of the most useful devices for securing and adjusting the tension on garage door springs and one which greatly facilitates the installation of such springs is the device described in U.S. Pat. No. 3,588,074 entitled "Device for Securing and Adjusting Springs," by John Ochs, the inventor of the present invention. The device in the foregoing patent includes a threaded rod hooked at one end and having a slidable sleeve thereon provided with an oppositely facing hook with nuts threaded on the rod beyond each end of the sleeve. The device described in the foregoing patent, while performing in a superior fashion to any related prior art device, does not have the advantages inherent in the device of my present invention as described herein.

The inventor is aware of the following related prior art United States Letters Patents, all of which are clearly distinguishable from my invention as defined herein, U.S. Pat. Nos. 1,636,562; 2,184,341; 2,265,629; 2,323,585; 2,684,238; 2,846,212; 2,985,446; 3,348,336; 3,420,489.

SUMMARY OF THE INVENTION

A particular advantage of the device of my present invention is that in garage door assemblies employing two springs, each spring may be separately tensioned as desired. Additionally, due to the novel arrangement of the threaded rods relative to the cross-bar member, the hooks for engaging the springs and the anchor bracket may easily be oriented relative to one another into a variety of configurations as may be required for any particular installation.

Therefore, it is an object of the present invention to provide a new and improved device particularly designed for securing and for adjusting garage door springs of the type referred to above, but also having other uses.

Another object is to provide a device which readily attaches either to a single spring or to a pair of springs at one end and which can be readily attached to an anchor bracket or the like on a door frame at the other end and which provides for initial ease of installation with the spring in a non-tensioned condition, and the subsequent adjustment thereof to place the springs in the required degree of tension.

Another object is to provide a device of the type described in the previous paragraph which, when a pair of springs is used, allows individual adjustment of the tension on each of the springs.

A further object is to provide a device of the type indicated which, when installed, is so designed and constructed that it readily pivots with the spring (or springs) to which it is connected as the garage door opens and closes, thereby obviating any possibility of the springs binding.

Another object of my invention is to provide a device of the type described which allows the hooked ends of the rods which are adapted to engage the garage door anchor bracket and the springs to be easily oriented relative to one another as may be required for any particular installation.

Still another object of the invention is to provide a device of the class described in which a curved adapter having hook portions at either extremity is provided to allow interconnection of the spring engaging rods with a single spring.

Another object of the invention is to provide a device of the type indicated which includes, due to its novel construction, the important safety feature of safeguarding against one spring of a pair of springs coming loose or breaking when the other spring fails.

In summary, the device of my invention comprises a first member having a plurality of apertures therethrough, a second member connected to the first member having a hooked end adapted to be connected to an anchor bracket, and a pair of threaded rods adjustably connected to the first member, each having a hooked end adapted to be connected to a coiled spring.

DESCRIPTION OF THE DRAWINGS

These and other objects will be apparent from the drawings and the following description. Referring to the drawings:

FIG. 1 is an elevational view of the hardware at one side of an overhead swinging garage door, the latter being fragmentarily shown in section and a device embodying the invention being included in the view.

FIG. 2 is an isometric view of the device embodying the invention shown in FIG. 1.

FIG. 3 is a cross-sectional view of the device shown in FIG. 1, but on a larger scale.

FIG. 4 is a cross-sectional elevational view of the device taken along line 4—4 of FIG. 1.

FIG. 5 is a plan view of a curved bracket having hooked ends adapted to engage the hooked ends of the pair of threaded rods of the device shown in FIG. 2 when a single coiled spring is used.

FIG. 6 is a plan view of a cross-bar member of an alternate form of the invention.

FIG. 7 is a cross-sectional elevational view similar to FIG. 4, but illustrating the construction of the alternate form of my invention using the cross-bar shown in FIG. 6.

DESCRIPTION OF THE PREFERRED EMBODIMENTS

More particularly describing the invention, numeral 11 generally designates a garage door shown in overhead position in a doorway of which one side frame 12 is shown and the door will be understood to be supported upon hardware at each side, such as the hardware at one side generally designated 13. This hardware includes a mounting plate 14, a short lever 15 pivotally mounted on the door at 16 and the plate at 17. The hardware further includes a long lever 18 affixed to the door at 20 and pivotally mounted on the plate at 22. At its free end, the lever is yieldably restrained by a pair of conventional coil tension springs designated 24 which are shown connected between it and an anchor bracket 26 mounted on the door frame. In this instance a device 28 embodying the invention serves as the means for connecting the lower ends of the springs to the anchor bracket 26.

Referring particularly to FIGS. 2 and 3, the device 28 can be seen to comprise a first or cross-bar member 30 having a plurality of apertures 32 therethrough, one of which, designated as 32', is internally threaded. A threaded anchor rod 34, including an elongated straight threaded section 36, constitutes a second member which is threadably received at one end in aperture 32 of the first member, and is provided at its other or lower end with a generally U-shaped hooked end portion 38, the purpose of which is to provide means for securing it to the anchor bracket 26 as best shown in FIG. 4. By threading second member or anchor rod 34 into and out of the cross-member, it is possible to adjust the distance between the cross-bar and the anchor bracket. Also, by rotating anchor rod 34 relative to the cross-bar, it is possible to orient the hook into any plane which may be appropriate to most easily interconnect the rod to the anchor bracket. A nut 40 is provided on anchor rod 34 on the side of the cross-bar member farthest from the anchor bracket for the purpose of locking rod 34 in the desired position relative to the cross-bar member. Although rod 34 is illustrated as threadably connected to the cross-bar, it is to be understood that the rod may be affixed thereto in any suitable manner including, for example, fixedly connecting it as by welding or brazing it thereto in the desired orientation.

Protruding through apertures 32 in cross-bar member 30 are spaced first and second elongated threaded rods 42 and 44 which have straight threaded lower sections 46 and 48 respectively. Rods 42 and 44 terminate at their upper ends in generally U-shaped hook portions 50 and 52 which are normally disposed in the same plane with the open portions thereof facing away from each other. As best shown in FIGS. 1 and 4, these hook portions are adapted to securely engage loops or eyes 54 provided at the lower end portions of coiled springs 24.

at the far end of threaded rods 42 and 44 with respect to the hooked ends 50 and 52, there are provided nuts 55 and 56 which are adapted to engage the surface of the cross-member farthest from the hooked ends of the rods. When the device is in place as shown in FIG. 1, threading the nuts 55 and 56 onto the rods serves to shorten the distance between the hooked ends of the rod and the cross-member, as illustrated by the phantom lines in FIG. 3, and hence place the springs under tension. Since each nut is separately adjustable on the threaded section of the rod upon which it is mounted, it is possible to individually adjust the tension on each of the tension springs as may be necessary to properly install the springs, and to properly maintain the apparatus in optimum operating condition.

Preferably, nuts designated as 58 and 60 are provided on threaded rods 42 and 44 on the side of cross-bar 30 nearest the hooked ends thereof for the purpose of securely locking the cross-bar in a position against nuts 55 and 56 when the desired tension has been placed on the coiled springs.

In FIG. 5 I show a curved adapter 57 for use with the device, as previously described, when only a single spring is used in the garage door apparatus. Adapter 57 has a generally U-shaped center portion 58 adapted to engage the lower end of the single coil spring and integral hook-shaped portions 60 and 62 on either side of center portion 58 which are adapted to engage hook portions 50 and 52 of rods 42 and 44. With hook portions 60 and 62 of the adapter in interlocking engagement with hook portions 42 and 44 of the threaded rods, the center U-shaped portion of the adapter may be connected to the loop or strap of a single coil spring and the spring placed under tension by threading nuts 58 and 60 toward cross-bar 30 on rods 42 and 44, thereby shortening the distance between hook ends 50 and 52 and cross-bar 30.

In FIG. 6 I show a cross-bar member 64 which is to be used in another form of my invention. This form of the invention is also adapted to be used with a garage door apparatus using either a pair of coil springs or a single coil spring. In this form of my invention, which is further illustrated in FIG. 7, cross-bar 64 is wider than the cross-bar previously described and also, in addition to apertures 32 and 32', is provided with an aperture 66 located adjacent to and centered on the same transverse center line as aperture 32'. When a single coil spring 68 is used as is illustrated in FIG. 7, a threaded rod 70, which is of the same general configuration as threaded rods 42 and 44 previously described, protrudes through aperture 66 and is provided with a nut 72 on the side of cross-bar 64 farthest away from its hook-shaped end 74. A threaded anchor rod 34 is received in aperture 32' and is threadably or otherwise connected to the cross-member in the same manner as previously described so that when the anchor rod is attached to the anchor plate, as illustrated in FIG. 7, and nut 72 is threaded upon rod 70, the distance between cross-bar 64 and spring 68 is shortened, thereby placing the spring under tension. A nut 40 is provided on rod 34 to lock it into position relative to the cross-bar. Preferably, a second nut designated in FIG. 7 as 73 is provided on rod 70 on the side of cross-bar 64 nearest the hooked end of the rod for the purpose of securely locking the cross-bar in the desired position against nut 72.

I claim:

1. A device for securing and independently adjusting a pair of springs adapted to be connected between a pair of coiled tension springs and an anchor bracket having an aperture therethrough for receiving a hook, comprising:

a. an elongated cross-bar having a plurality of apertures therethrough;

b. a depending threaded anchor rod threadably connected to said cross-bar, said anchor rod having a hooked end adapted to be received in the aperture of the anchor bracket;

c. a first upwardly extending threaded rod receivable in an aperture in said cross-bar and movable axially relative thereto, said first threaded rod having a hooked end disposed on the side of said cross-bar opposite the side thereof facing the anchor bracket;

d. a nut on said first threaded rod on the side of said cross-bar farthest from the hooked end of said first rod;

e. a second upwardly extending threaded rod receivably in an aperture in said cross-bar and movable axially relative thereto, said second threaded rod extending in a spaced, generally parallel relationship with said first threaded rod and having a hooked end disposed in proximity with but normally facing oppositely relative to the hooked end of said first threaded rod; and f. a nut on said second threaded rod on the side of said cross-bar farthest from the hooked end of said second rod.

2. The device of claim 1 in which a nut is provided on said threaded anchor rod on the side of said cross-bar farthest from the hooked end thereof.

3. The device of claim 1 in which a second nut is provided on each of said first and second threaded rods on the side of said cross-bar nearest to the hooked ends of said first and second rods.

4. The device of claim 1 including a curved adapter member having a generally U-shaped center portion adapted to engage the end of a coiled spring and integral hook portions on either side of the U-shaped center portion, said hook portions being adapted to engage the hook ends of said first and second threaded rods.

* * * * *